(12) United States Patent
Ye et al.

(10) Patent No.: US 11,991,610 B2
(45) Date of Patent: May 21, 2024

(54) LONG TERM EVOLUTION (LTE) CONTROL REGION FOR DOWNLINK TRANSMISSIONS FOR ENHANCED MACHINE TYPE COMMUNICATIONS (eMTC)

(71) Applicant: APPLE INC., Cupertino, CA (US)

(72) Inventors: Qiaoyang Ye, San Jose, CA (US); Gregory V. Morozov, Nizhny Novgorod (RU); Debdeep Chatterjee, San Jose, CA (US)

(73) Assignee: APPLE INC., Cupertino, CA (US)

( * ) Notice: Subject to any disclaimer, the term of this patent is extended or adjusted under 35 U.S.C. 154(b) by 596 days.

(21) Appl. No.: 17/265,777

(22) PCT Filed: Aug. 8, 2019

(86) PCT No.: PCT/US2019/045796
§ 371 (c)(1),
(2) Date: Feb. 3, 2021

(87) PCT Pub. No.: WO2020/033758
PCT Pub. Date: Feb. 13, 2020

(65) Prior Publication Data
US 2021/0168577 A1   Jun. 3, 2021

Related U.S. Application Data

(60) Provisional application No. 62/717,670, filed on Aug. 10, 2018.

(51) Int. Cl.
*H04W 4/70* (2018.01)
*H04W 8/24* (2009.01)
(Continued)

(52) U.S. Cl.
CPC ............... *H04W 4/70* (2018.02); *H04W 8/24* (2013.01); *H04W 72/0446* (2013.01); *H04W 72/0453* (2013.01); *H04W 72/23* (2023.01)

(58) Field of Classification Search
CPC . H04W 4/70; H04W 72/042; H04W 72/0446; H04W 72/0453; H04W 72/23;
(Continued)

(56) References Cited

U.S. PATENT DOCUMENTS 10,631,234 B2 * 4/2020 Gupta .................. H04W 72/542
10,939,251 B2 * 3/2021 Fujishiro .................. H04W 8/08
(Continued)

FOREIGN PATENT DOCUMENTS

CN          105981428 A      9/2016
KR      1020160108661 A      9/2016
(Continued)

OTHER PUBLICATIONS

Ericsson, et al., "New WID on Rel-16 MTC enhancements for LTE", RP-181450, 3GPP TSG RAN Meeting #80La Jolla, California, Agenda Item 10.1.3, Jun. 11-14, 2018, 4 pages.
(Continued)

*Primary Examiner* — Rasheed Gidado
(74) *Attorney, Agent, or Firm* — Dorsey & Whitney LLP

(57) ABSTRACT

Technology for an eNodeB operable to perform downlink (DL) transmissions using a Long Term Evolution (LTE) control region of a subframe for enhanced machine type communication (eMTC) is disclosed. The eNodeB can encode a system information block type 1 bandwidth reduced (SIB1-BR) for transmission 5 to a bandwidth reduced low complexity or coverage enhancement (BL/CE) user equipment (UE). The SIB1-BR can include an indication that the LTE control region in the subframe includes information for at least one of a machine type communication (MTC) physical downlink control channel (MPDCCH) transmission or a physical downlink shared channel (PDSCH) transmission. 10 The eNodeB can encode at least one of the MPDCCH transmission or the PDSCH transmis-
(Continued)

sion for delivery in a downlink over the LTE control region in the subframe to the BL/CE UE.

18 Claims, 10 Drawing Sheets

(51) Int. Cl.
  *H04W 72/04* (2023.01)
  *H04W 72/0446* (2023.01)
  *H04W 72/0453* (2023.01)
  *H04W 72/23* (2023.01)

(58) Field of Classification Search
  CPC ........ H04W 8/24; H04L 5/005; H04L 5/0051; H04L 5/0053; H04L 5/0094; H04L 5/0044
  See application file for complete search history.

(56) References Cited

U.S. PATENT DOCUMENTS

| | | | |
|---|---|---|---|
| 11,356,928 B2* | 6/2022 | Wang | H04W 48/08 |
| 11,700,586 B2* | 7/2023 | Sengupta | H04W 72/0446 370/350 |
| 2016/0295345 A1 | 10/2016 | Oh | |
| 2017/0318478 A1 | 11/2017 | Basu et al. | |
| 2019/0104503 A1* | 4/2019 | Niu | H04L 25/0202 |
| 2019/0150155 A1* | 5/2019 | Chatterjee | H04W 72/23 370/335 |
| 2020/0322875 A1* | 10/2020 | Höglund | H04W 48/12 |

FOREIGN PATENT DOCUMENTS

| | | |
|---|---|---|
| KR | 1020170025219 A | 3/2017 |
| KR | 101805640 B1 | 12/2017 |
| WO | 2015138072 A1 | 9/2015 |
| WO | 2017196393 A1 | 11/2017 |

OTHER PUBLICATIONS

PCT/US2019/045796, International Search Report and Written Opinion, Nov. 29, 2019, 8 pages.
Ericsson, "Introduction of Further Enhanced MTC for LTE", R1-1704139, 3GPP TSG-RAN WG1 Meeting #88, Athens, Greece, Change Request 36.211 CR 0332 rev 1 Current version 14.1.0, Feb. 13-17, 201, 26 pages.
Intel Corporation, "Draft CR on PDSCH scrambling for eMTC", R1-164124, 3GPP TSG-RAN WG1 Meeting #85, Nanjing, China, Draft Change Request 36.211, current version 13.1.0, May 23-27, 2016, 3 pages.
Wi Rapporteur (Ericsson), "Agreement summary for Rel-15 Even further enhanced MTC for LTE", R1-1807581, 3GPP TSG-RAN WG1 Meeting #93, Busan, Korea, Agenda Item 6.2.6, May 21-25, 2018, 44 pages.

* cited by examiner

LONG TERM EVOLUTION (LTE) CONTROL REGION FOR DOWNLINK TRANSMISSIONS FOR ENHANCED MACHINE TYPE COMMUNICATIONS (eMTC)

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
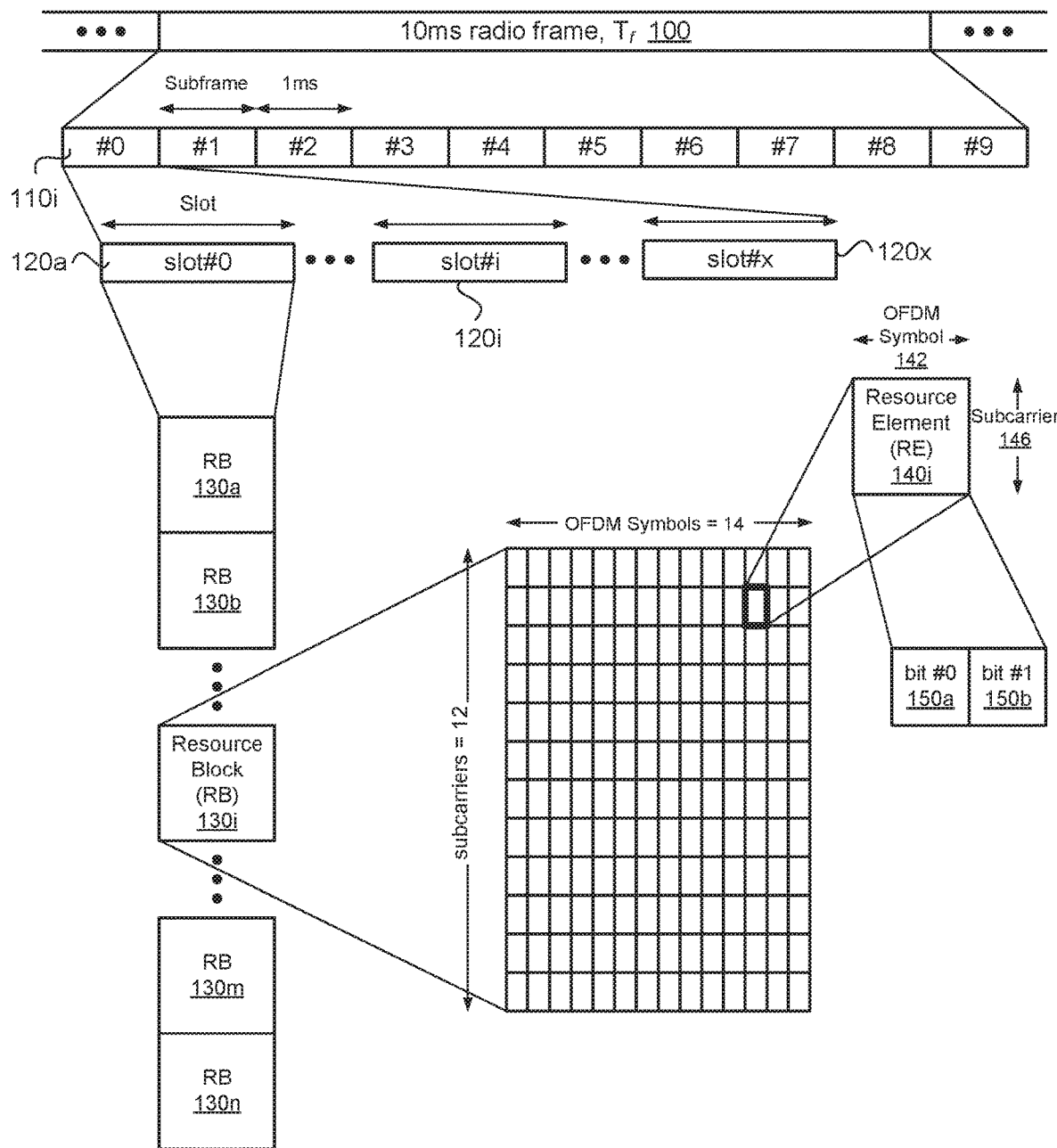
FIG. 1 illustrates a block diagram of a Third-Generation Partnership Project (3GPP) frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," "New Radio Base Stations (NR BS)" and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 provides an example of a 3GPP frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into one or multiple slots 120$a$, 120$i$, and 120$x$, each with a duration, $T_{slot}$, of 1/μ ms, where μ=1 for 15 kHz subcarrier spacing, μ=2 for 30 kHz, μ=4 for 60 kHz, μ=8 for 120 kHz, and μ=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) 130$a$, 130$b$, 130$i$, 130$m$, and 130$n$ based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140*i* can transmit two bits 150*a* and 150*b* of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

In one configuration, a standalone deployment or standalone mode can be optimized for Release 16 enhanced MTC (eMTC). For example, LTE control region can be used for a downlink (DL) transmission, such as in an MTC physical downlink control channel (PDCCH) (MPDCCH) or a physical downlink shared channel (PDSCH), and the DL transmission can be to bandwidth reduced low complexity or coverage enhancement (BL/CE) UEs. This standalone deployment/mode can also be used to support legacy operations for legacy BL/CE UEs.

In one example, in the previous eMTC system, a starting symbol can be at least 1 when a number of DL physical resource blocks (PRBs) in the eMTC system is more than 10, and can be at least 2 when a number of DL PRBs in the eMTC system is less than or equal to 10. The symbols before the starting symbol for eMTC can be reserved for the LTE control channel region, for coexistence with LTE in-band operation. On the other hand, for the standalone deployment/ mode, the symbols reserved for the LTE control channel region can be exploited to improve DL resource utilization.

In one configuration, a design to enable use of the LTE control channel region for MPDCCH and PDSCH transmission(s) is described herein. In other words, the LTE control region can be utilized for the MPDCCH and PDSCH transmission(s). The design described herein includes applicable cases for using the LTE control region, e.g., unicast and/or common MPDCCH/PDSCH transmissions. Further, a technique for configuring the LTE control region, and using the LTE control region for unicast/common MPDCCH/PDSCH transmissions are described in further detail below.

In one configuration, with respect to the applicable cases, use of the LTE control region can apply only to unicast MPDCCH/PDSCH. Alternatively, use of the LTE control region can apply to both unicast and common DL transmissions. The common DL transmission can include a physical broadcast channel (PBCH), system information block 1 bandwidth reduced (SIB1-BR), system information block X bandwidth reduced (SIBx-BR) with x>1, MPDCCH/ PDSCH for random access response/message 4 (RAR/ Msg4) and/or paging.

In one configuration, with respect to configuration and UE capability, for configuration of use of the LTE control region, system information such as a master information block (MIB), SIB1-BR or SIBx-BR (x>1) can indicate whether UEs are expected to receive a MPDCCH/PDSCH with a starting symbol equal to symbol #0 of a subframe. For example, one reserved bit in the MIB can be used to indicate use of the LTE control region, which can allow use of the LTE control region for a PDSCH carrying a SIB1-BR and/or a PDSCH carrying other SIBs (if supported) and/or a MPDCCH and PDSCH associated with paging and random access procedures, in addition to unicast DL transmission(s). As another example, the SIB1-BR can carry an indication of whether the LTE control region is used, which can allow use of the LTE control region for a PDSCH carrying a SIBx-BR with x>1 (if supported) and/or a MPDCCH and PDSCH associated with paging and random access procedures and unicast DL transmission(s).

In one example, use of the LTE control region (e.g., a starting symbol of symbol #0) can be configured by dedicated radio resource control (RRC) signaling, which can be used for unicast DL transmission.

In one example, with respect to UE capability, a UE supporting use of the LTE control region for DL transmission(s) can be defined as an optional UE capability. A configuration for use of the LTE control region can depend on the UE capability. In one example, a UE can report the capability to a network, similar to a legacy capability reporting mechanism.

Alternatively, physical random access channel (PRACH) partitioning can be used for UE capability reporting regarding the support of LTE control region utilization, which can be used to optimize the RAR/Msg4 during the random access procedure.

In one configuration, with respect to use of the LTE control region for unicast MPDCCH/PDSCH transmission(s), for unicast MPDCCH/PDSCH transmission(s), rate matching can be used for the unicast MPDCCH/PDSCH when use of the LTE control region is enabled, where resource element (RE) mapping can take into account symbols in the LTE control region. The symbols among the first N symbols which carry a cell specific reference signal (CRS) in legacy systems can still carry the CRS on the same REs.

In one example, for unicast MPDCCH/PDSCH transmission(s), when use of the LTE control region is enabled, any N symbols (e.g., the first N symbols, or last N symbols, which can be defined in the 3GPP LTE specification) from the last 14-N symbols can be copied to the LTE control region, where N is the number of symbols in the LTE control region that corresponds to a minimum duration that is reserved for a legacy LTE PDCCH. In a specific example, N=1 for a DL system bandwidth (BW) greater than or equal to 10 PRBs, while N=2 for a DL system BW less than 10 PRBs. This approach can provide a realization of a lower code rate, as well as can enable frequency offset tracking using copies of two symbols. With respect to the frequency offset tracking using the copies of two symbols, in order to limit an amount of equivalent phase rotation caused by the frequency offset, the N symbols (which can be equal to 1 and 2, respectively) can be copied from symbol #1 to symbol #0, and from symbols {#2, #3} to symbols {#0, #1} for a DL system BW greater than or equal to 10 PRBs and less than 10 PRBs respectively.

In one example, for unicast MPDCCH/PDSCH transmission(s), when use of the LTE control region is enabled, the first N symbols can be used to carry reference signals, e.g., demodulation reference signals (DMRS) or CRS, or a new reference signal or preamble, which can improve a channel estimation performance, and can also benefit a frequency offset estimation for cases with N>1.

In one example, a frequency domain mapping of the DMRS/CRS can be the same as one of the symbols carrying a DMRS/CRS in a last 14-N symbols, and remaining REs can be left empty to facilitate possible power boosting.

Further, in such cases, a relative DL power (such as an energy per resource element, or EPRE) for the DMRS/CRS REs within the first N symbols of the subframe to that for the DMRS/CRS REs in the last 14-N symbols of the subframe can be indicated to the UE. For example, the relative DL power can be indicated to the UE via a broadcast (SIB1-BR or other SI messages) or via UE-specific RRC signaling.

In an alternative example, all of the REs in the first N symbols can be used to carry the reference signals. For example, the DMRS/CRS can be repeated in a frequency domain, or alternatively, a new sequence can be defined to map to all REs within the first N symbols, with the exception of REs used for CRS transmission(s) that are still used for CRS transmissions, as in the legacy LTE DL control region. Whether to repeat the DMRS or CRS in remaining REs (other than the already-present CRS REs) of the first N symbols of the subframe can be implicitly linked to the RS associated with the transmission in the particular subframe, e.g., for the MPDCCH and PDSCH using a DMRS-based transmission scheme, a DMRS pattern can be repeated, while for a PDSCH using a CRS-based transmission scheme, CRS REs can be repeated in frequency.

In one configuration, with respect to use of the LTE control region for common MPDCCH/PDSCH transmission(s), a number of symbols in the LTE control region can be denoted as N. For common MPDCCH/PDSCH transmission(s), to keep backward compatibility, a transmission in the last 14-N symbols in the subframe can be kept the same.

In one example, for broadcast/common MPDCCH/PDSCH transmission(s), when use of the LTE control region is enabled, any N symbols (e.g., the first N symbols, or last N symbols, which can be defined in the 3GPP LTE specification) from the last 14-N symbols can be copied to the LTE control region, where N is the number of symbols in the LTE control region. In a specific example, N=1 for a DL system BW greater than or equal to 10 PRBs, while N=2 for a DL system BW less than 10 PRBs. This approach can provide a realization of a lower code rate, as well as can enable frequency offset tracking using copies of two symbols. With respect to the frequency offset tracking using the copies of two symbols, in order to limit an amount of equivalent phase rotation caused by the frequency offset, the N symbols (which can be equal to 1 and 2, respectively) can be copied from symbol #1 to symbol #0, and from symbols {#2, #3} to symbols {#0, #1} for a DL system BW greater than or equal to 10 PRBs and less than 10 PRBs respectively.

In an alternative example, for broadcast/common MPDCCH/PDSCH transmission(s), when use of the LTE control region is enabled, the first N symbols can be used to carry reference signals, e.g., DMRS/CRS, which can improve a channel estimation performance, and can also benefit a frequency offset estimation for cases with N>1.

In one example, a frequency domain mapping of a DMRS/CRS can be the same as one of the symbols carrying a DMRS/CRS in a last 14-N symbols, and remaining REs can be left empty to facilitate possible power boosting. Further, in such cases, a relative DL power (such as an EPRE) for the DMRS/CRS REs within the first N symbols of the subframe to that for DMRS/CRS REs in the last 14-N symbols of the subframe can be indicated to the UE via broadcast (SIB1-BR or other SI messages) or via UE-specific RRC signaling.

In an alternative example, all the REs in the first N symbols can be used to carry the reference signals. For example, the DMRS/CRS can be repeated in a frequency domain, or alternatively, a new sequence can be defined to map to all REs within the first N symbols, with the exception of the REs used for CRS transmission(s) that are still used for CRS transmissions, as in the legacy LTE DL control region. Whether to repeat DMRS or CRS in remaining REs (other than the already-present CRS REs) of the first N symbols of the subframe can be implicitly linked to the RS associated with the transmission in the particular subframe, e.g., for the MPDCCH and PDSCH using a DMRS-based transmission scheme, a DMRS pattern can be repeated, while for a PDSCH using a CRS-based transmission scheme, CRS REs can be repeated in frequency.

In one configuration, with respect to paging, UEs can be grouped such that UEs associated to a same paging occasion (PO) can include all the UEs supporting use of the LTE control region, when use of the LTE control region is enabled for the corresponding paging transmission. This approach can necessitate changes in a UE grouping for the PO, which can depend on a UE ID in current systems.

In one configuration, with respect to the RAR/Msg4, when a UE capability report, e.g., via PRACH partitioning, is supported such that a base station is aware of a UE capability before the RAR transmission, rate matching (similar to that used for unicast MPDCCH/PDSCH transmissions, as described above) can be applied, where an RE mapping can take into account the REs available in the first N symbols for the RAR/Msg4 transmission. In addition, symbols among the first N symbols which carry a CRS in legacy systems can still carry the CRS on the same REs.

In one example, paging and random access related DL transmissions can be transmitted by transmitting copies of the first N of the set of last 14-N symbols in the subframe (e.g., symbols #1 or #2 and #3) in the first N symbols of the subframe. Alternatively, existing CRS REs or DMRS REs associated with MPDCCH CSS Types 1 or 2 can be copied in frequency to fill up the REs in the first N symbols of the subframe. However, for either option, the base station may not be aware of whether the UE is capable of utilizing the additional copies of OFDM symbols or CRS REs.

In one example, for a base station indicating use of an entire LTE DL control channel region (e.g., use of the first N symbols in a subframe), a current indication of the starting symbol for the MPDCCH and PDSCH can only indicate a starting symbol equal to symbol #1 for a system BW greater than or equal to 10 PRBs, and a starting symbol equal to symbol #2 for a DL system BW less than 10 PRBs.

In one configuration, a design of using an LTE control region for DL transmission(s) is described herein. In one example, system information such as a MIB, a SIB1-BR or a SIBx-BR (x>1) can be used to indicate whether UEs are expected to receive a MPDCCH/PDSCH with a starting symbol equal to symbol #0 of a subframe. In another example, use of the LTE control region (e.g., starting symbol of symbol #0) can be configured using dedicated RRC signaling.

In one example, for a unicast MPDCCH/PDSCH transmission, when use of the LTE control region is enabled, rate matching can be used for the unicast MPDCCH/PDSCH, where an RE mapping takes into account symbols in the LTE control region. In another example, for a unicast MPDCCH/PDSCH transmission, when use of the LTE control region is enabled, any N symbols (e.g., the first N symbols, or last N symbols) from the last 14-N symbols of a subframe can be copied to the LTE control region, where N is the number of symbols in the LTE control region that corresponds to a minimum duration that is reserved for a legacy LTE PDCCH. In a further example, for a unicast MPDCCH/PDSCH transmission, when use of LTE control region is enabled, the first N symbols can be used to carry reference signals, e.g., DMRS/CRS, or a new reference signal or preamble.

In one example, for a broadcast/common MPDCCH/PDSCH transmission, when use of the LTE control region is enabled, any N symbols (e.g., the first N symbols, or last N symbols) from the last 14-N symbols of a subframe can be copied to the LTE control region, where N is the number of symbols in the LTE control region that corresponds to a minimum duration that is reserved for a legacy LTE PDCCH. In another example, for a broadcast/common MPDCCH/PDSCH transmission, when use of the LTE control region is enabled, the first N symbols can be used to carry reference signals, e.g., DMRS/CRS, or a new reference signal or preamble.

Figure 2:
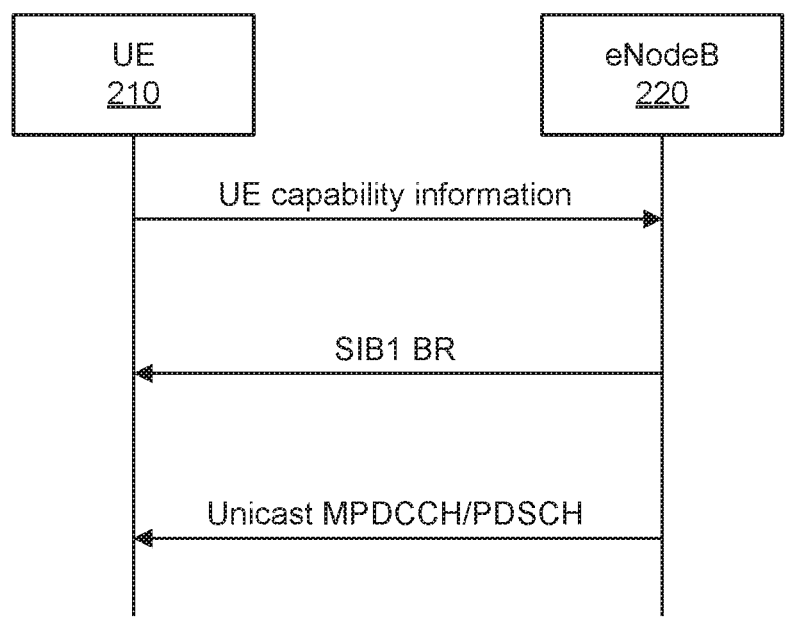
FIG. 2 illustrates signaling between a user equipment (UE) and an eNodeB for unicast machine type communication (MTC) physical downlink control channel (MPDCCH) and physical downlink shared channel (PDSCH) transmissions in accordance with an example.

FIG. 2 illustrates an example of signaling between a user equipment (UE) 210 and an eNodeB 220 for unicast machine type communication (MTC) physical downlink control channel (MPDCCH) and physical downlink shared channel (PDSCH) transmissions. The eNodeB 220 can perform DL transmissions using an LTE control region of a subframe for enhanced machine type communication (eMTC). For example, the UE 210 can transmit a UE capability message to the eNodeB 220, wherein the capability message can indicate that the UE 210 is capable of receiving an MPDCCH/PDSCH transmission over the LTE control region in the subframe. Further, the eNodeB 220 can transmit a system information block type 1 bandwidth reduced (SIB1-BR) to the UE 210, wherein the SIB1-BR can include an indication that the LTE control region in the subframe supports the MPDCCH/PDSCH transmission. Further, the eNodeB 220 can deliver the MPDCCH/PDSCH transmission, such as a unicast MPDCCH/PDSCH transmission in a downlink over the LTE control region in the subframe to the UE 210.

Figure 3:
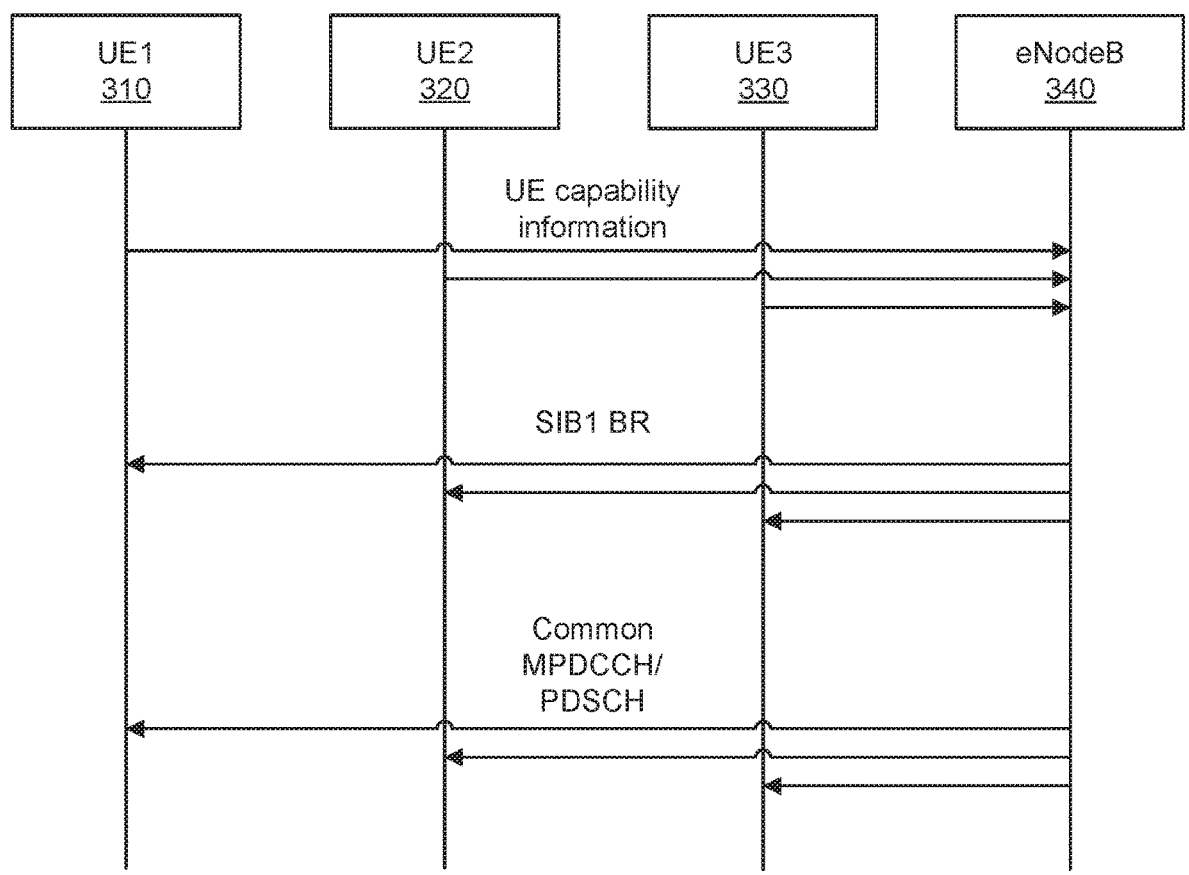
FIG. 3 illustrates signaling between multiple user equipment (UE) and an eNodeB for common MPDCCH and PDSCH transmissions in accordance with an example.

FIG. 3 illustrates an example of signaling between multiple user equipment (UE) and an eNodeB 340 for common MPDCCH and PDSCH transmissions, where the multiple UEs include a first UE (UE1) 310, a second UE (UE2) 320 and a third UE (UE3) 330. The eNodeB 340 can perform DL transmissions using an LTE control region of a subframe for enhanced machine type communication (eMTC). For example, the multiple UEs 310, 320, 330 can transmit respective UE capability messages to the eNodeB 340, wherein the capability message can indicate that the multiple UEs 310, 320, 330 are capable of receiving MPDCCH/PDSCH transmissions over the LTE control region in the subframe. Further, the eNodeB 340 can transmit a system information block type 1 bandwidth reduced (SIB1-BR) to the multiple UEs 310, 320, 330, wherein the SIB1-BR can include an indication that the LTE control region in the subframe supports the MPDCCH/PDSCH transmission. Further, the eNodeB 340 can deliver the MPDCCH/PDSCH transmission, such as a common or broadcast MPDCCH/PDSCH transmission in a downlink over the LTE control region in the subframe to the multiple UEs 310, 320, 330.

Figure 4:
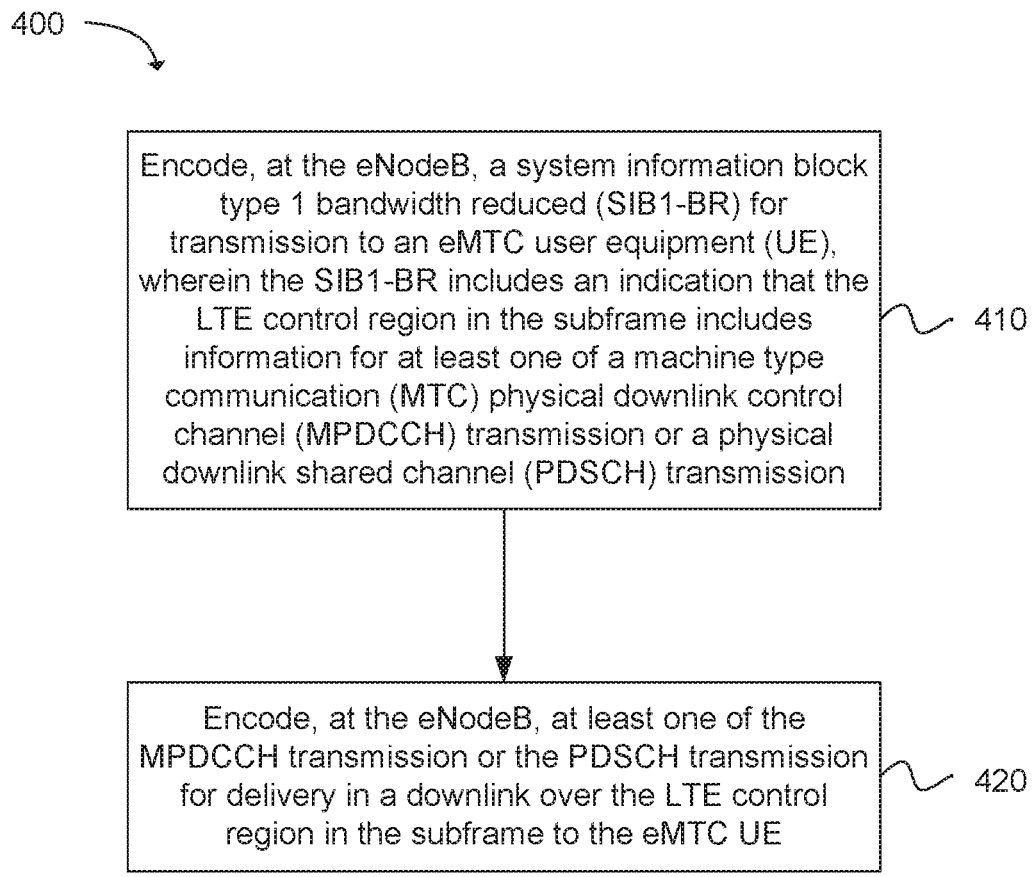
FIG. 4 depicts functionality of an eNodeB operable to perform downlink (DL) transmissions using a Long Term Evolution (LTE) control region of a subframe for enhanced machine type communication (eMTC) in accordance with an example.

Another example provides functionality 400 of an eNodeB operable to perform downlink (DL) transmissions using a Long Term Evolution (LTE) control region of a subframe for enhanced machine type communication (eMTC), as shown in FIG. 4. The eNodeB can comprise one or more processors configured to encode, at the eNodeB, a system information block type 1 bandwidth reduced (SIB1-BR) for transmission to an eMTC user equipment (UE), wherein the SIB1-BR includes an indication that the LTE control region in the subframe includes information for at least one of a machine type communication (MTC) physical downlink control channel (MPDCCH) transmission or a physical downlink shared channel (PDSCH) transmission, as in block 410. The eNodeB can comprise one or more processors configured to encode, at the eNodeB, at least one of the MPDCCH transmission or the PDSCH transmission for delivery in a downlink over the LTE control region in the subframe to the eMTC UE, as in block 420. In addition, the eNodeB can comprise a memory interface configured to retrieve from a memory the indication to be included in the SIB1-BR.

Figure 5:
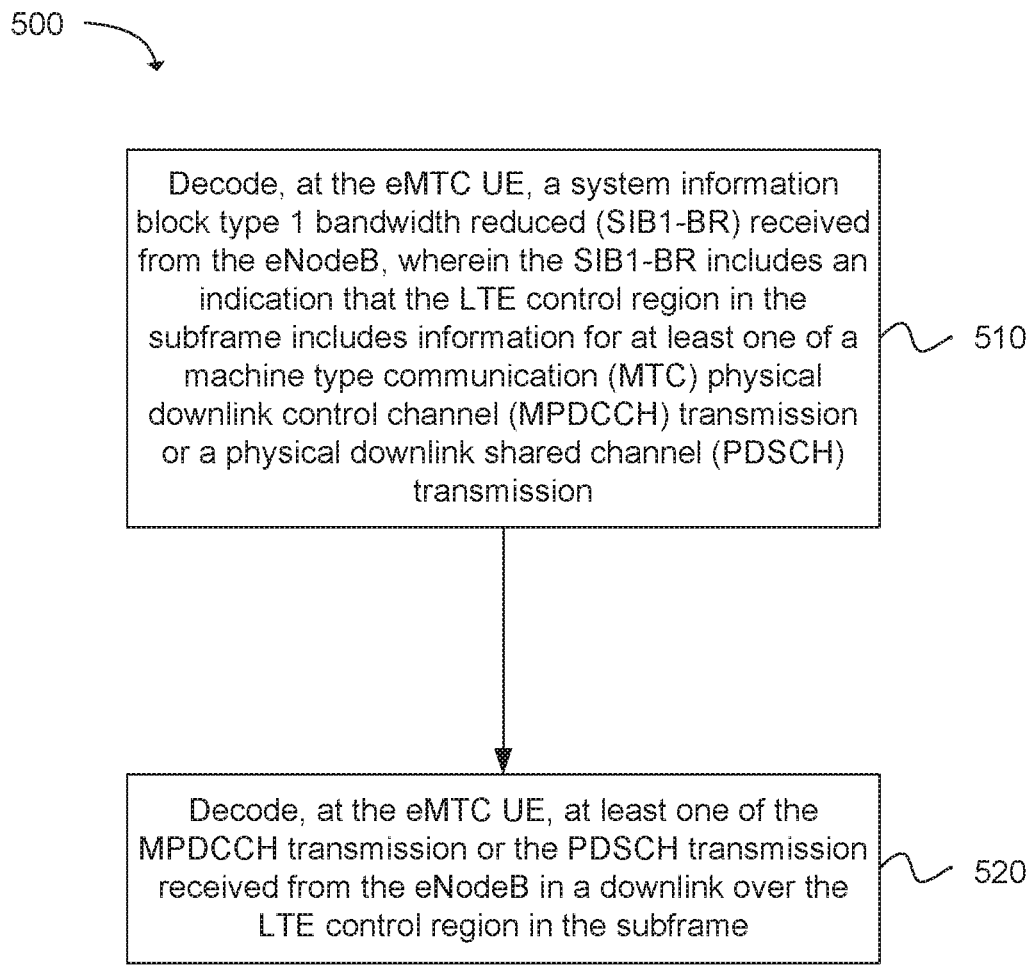
FIG. 5 depicts functionality of an enhanced machine type communication (eMTC) user equipment (UE) operable to decode downlink (DL) transmissions received from an eNodeB over a Long Term Evolution (LTE) control region of a subframe in accordance with an example.

Another example provides functionality 500 of an enhanced machine type communication (eMTC) user equipment (UE) operable to decode downlink (DL) transmissions received from an eNodeB over a Long Term Evolution (LTE) control region of a subframe, as shown in FIG. 5. The eMTC UE can comprise one or more processors configured to decode, at the eMTC UE, a system information block type 1 bandwidth reduced (SIB1-BR) received from the eNodeB, wherein the SIB1-BR includes an indication that the LTE control region in the subframe includes information for at least one of a machine type communication (MTC) physical downlink control channel (MPDCCH) transmission or a physical downlink shared channel (PDSCH) transmission, as in block 510. The eMTC UE can comprise one or more processors configured to decode, at the eMTC UE, at least one of the MPDCCH transmission or the PDSCH transmission received from the eNodeB in a downlink over the LTE control region in the subframe, as in block 520. In addition, the eMTC UE can comprise a memory interface configured to send to a memory the indication in the SIB1-BR.

Figure 6:
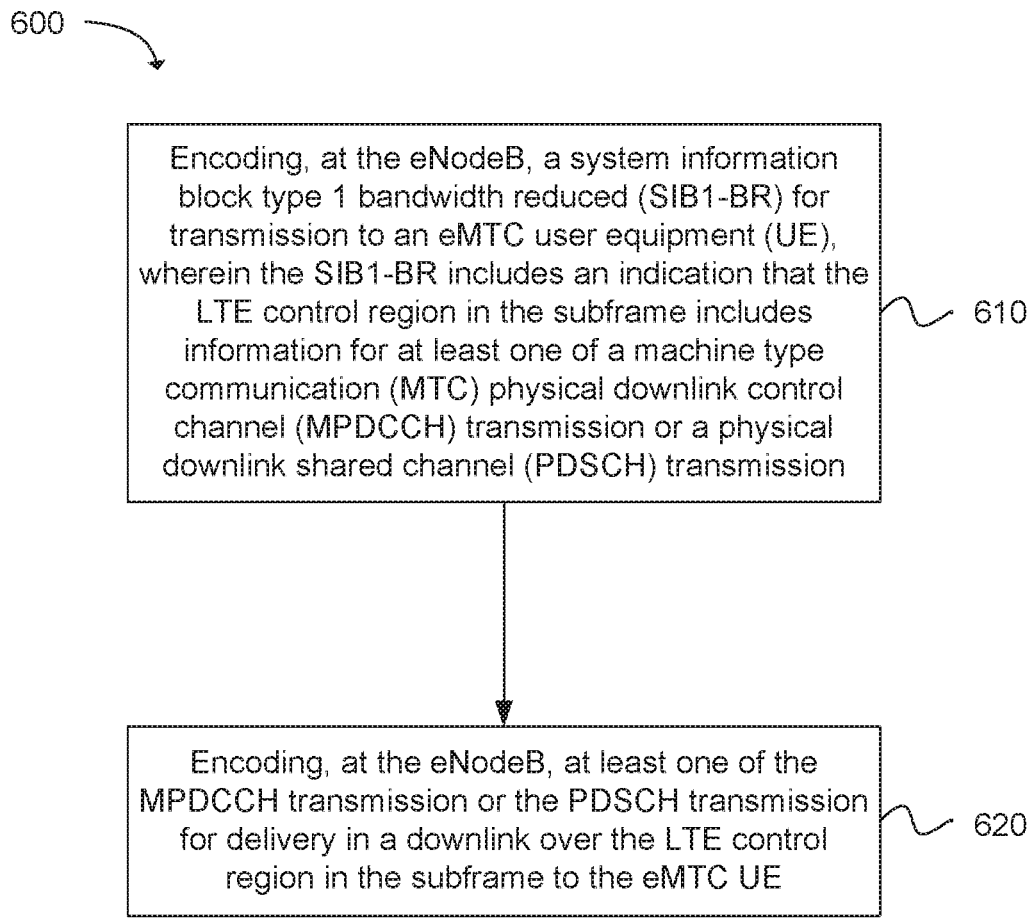
FIG. 6 depicts a flowchart of a machine readable storage medium having instructions embodied thereon for performing downlink (DL) transmissions using a Long Term Evolution (LTE) control region of a subframe for enhanced machine type communication (eMTC) in accordance with an example.

Another example provides at least one machine readable storage medium having instructions 600 embodied thereon for performing downlink (DL) transmissions using a Long Term Evolution (LTE) control region of a subframe for enhanced machine type communication (eMTC), as shown in FIG. 6. The instructions can be executed on a machine, where the instructions are included on at least one computer readable medium or one non-transitory machine readable storage medium. The instructions when executed by one or more processors of an eNodeB perform: encoding, at the eNodeB, a system information block type 1 bandwidth reduced (SIB1-BR) for transmission to an eMTC user equipment (UE), wherein the SIB1-BR includes an indication that the LTE control region in the subframe includes information for at least one of a machine type communication (MTC) physical downlink control channel (MPDCCH) transmission or a physical downlink shared channel (PDSCH) transmission, as in block 610. The instructions when executed by one or more processors of the eNodeB perform: encoding, at the eNodeB, at least one of the MPDCCH transmission or the PDSCH transmission for delivery in a downlink over the LTE control region in the subframe to the eMTC UE, as in block 620.

Figure 7:
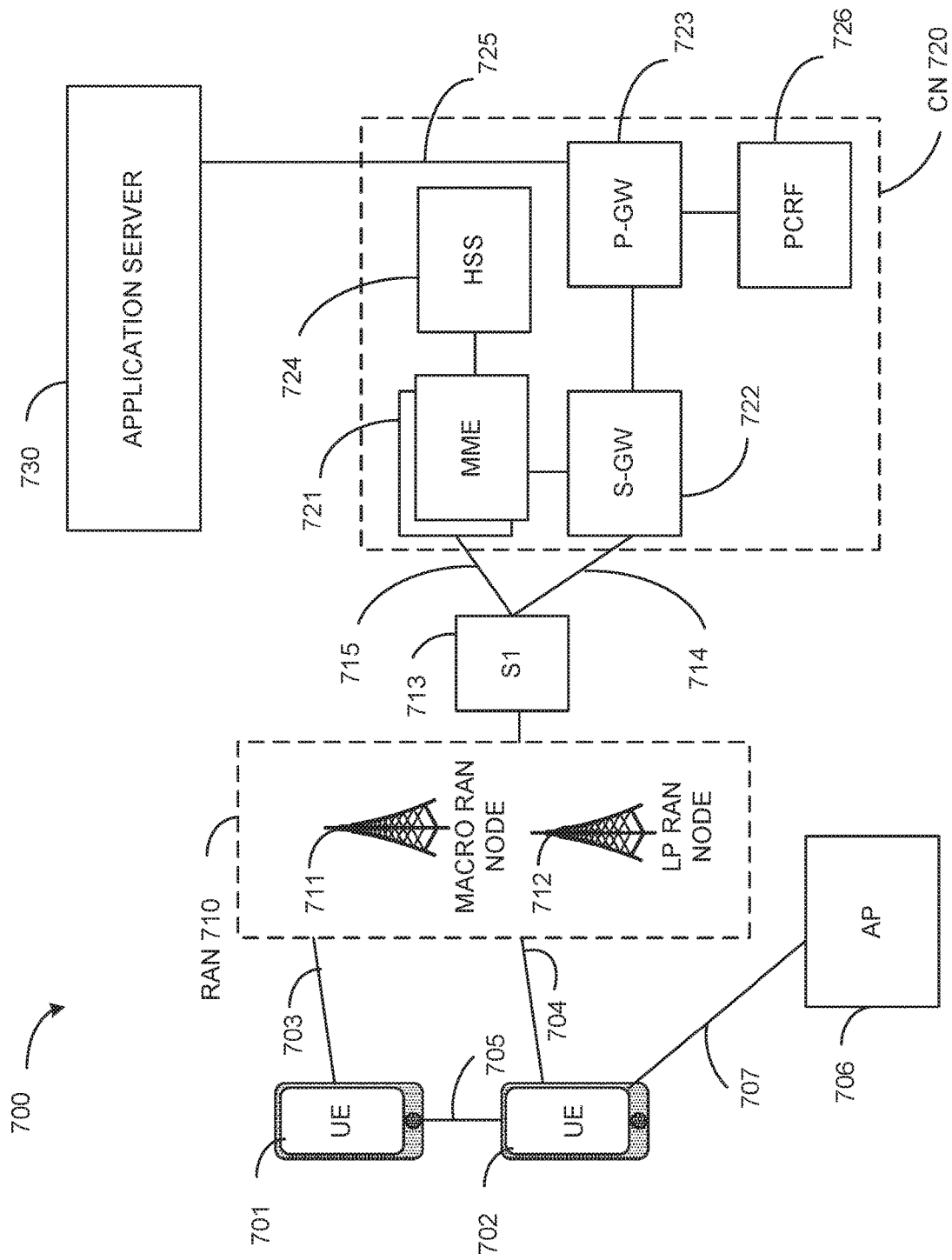
FIG. 7 illustrates an architecture of a wireless network in accordance with an example.

FIG. 7 illustrates an architecture of a system 700 of a network in accordance with some embodiments. The system 700 is shown to include a user equipment (UE) 701 and a UE 702. The UEs 701 and 702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 701 and 702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710—the RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections 703 and 704, respectively, each of which comprises a physical communications interface or layer (discussed in further detail below); in this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 702 is shown to be configured to access an access point (AP) 706 via connection 707. The connection 707 can comprise a local wireless connection, such as a connection consistent with any IEEE 802.15 protocol, wherein the AP 706 would comprise a wireless fidelity (WiFi®) router. In this example, the AP 706 is shown to be connected to the Internet without connecting to the core network of the wireless system (described in further detail below).

The RAN 710 can include one or more access nodes that enable the connections 703 and 704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 710 may include one or more RAN nodes for providing macrocells, e.g., macro RAN node 711, and one or more RAN nodes for providing femtocells or picocells (e.g., cells having smaller coverage areas, smaller user capacity, or higher bandwidth compared to macrocells), e.g., low power (LP) RAN node 712.

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 702 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 710 is shown to be communicatively coupled to a core network (CN) 720—via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and the serving gateway (S-GW) 722, and the S1-mobility management entity (MME) interface 715, which is a signaling interface between the RAN nodes 711 and 712 and MMEs 721.

In this embodiment, the CN 720 comprises the MMEs 721, the S-GW 722, the Packet Data Network (PDN) Gateway (P-GW) 723, and a home subscriber server (HSS) 724. The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate an SGi interface toward a PDN. The P-GW 723 may route data packets between the EPC network and external networks such as a network including the application server 730 (alternatively referred to as application function (AF)) via an Internet Protocol (IP) interface 725. Generally, the application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The P-GW 723 may further be a node for policy enforcement and charging data collection. Policy and Charging Enforcement Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

Figure 8:
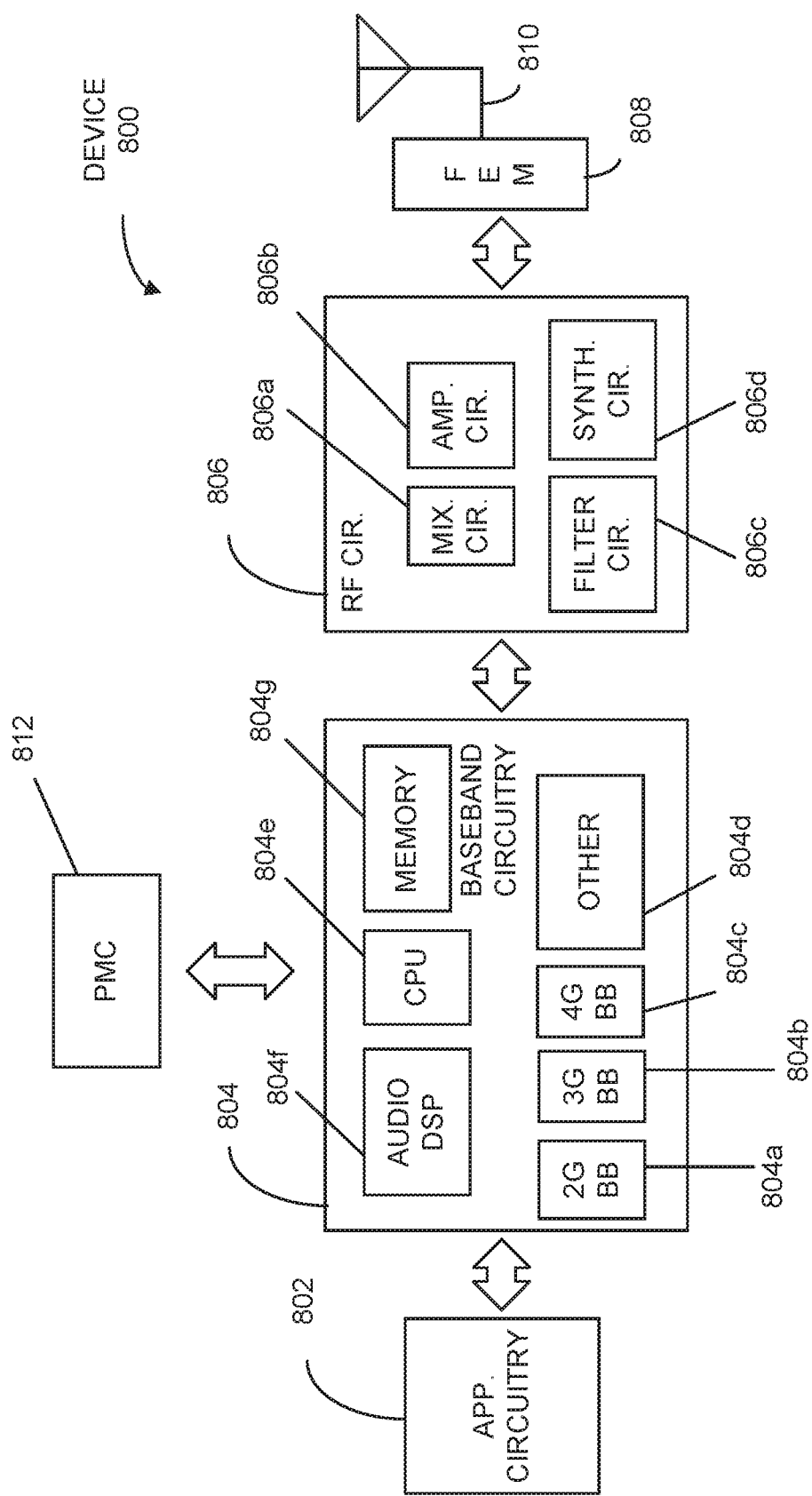
FIG. 8 illustrates a diagram of a wireless device (e.g., UE) in accordance with an example.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include less elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband circuitry 804 may interface with the application circuitry 802 for generation and processing of the baseband signals and for controlling operations of the RF circuitry 806. For example, in some embodiments, the baseband circuitry 804 may include a third generation (3G) baseband processor 804a, a fourth generation (4G) baseband processor 804b, a fifth generation (5G) baseband processor 804c, or other baseband processor(s) 804d for other existing generations, generations in development or to be developed in the future (e.g., second generation (2G), sixth generation (6G), etc.). The baseband circuitry 804 (e.g., one or more of baseband processors 804a-d) may handle various radio control functions that enable communication with one or more radio networks via the RF circuitry 806. In other embodiments, some or all of the functionality of baseband processors 804a-d may be included in modules stored in the memory 804g and executed via a Central Processing Unit (CPU) 804e. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804f. The audio DSP(s) 804f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 804 or the application circuitry

802 depending on the desired output frequency. In some embodiments, a divider control input (e.g., N) may be determined from a look-up table based on a channel indicated by the application circuitry 802.

Synthesizer circuitry 806*d* of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM circuitry 808, or in both the RF circuitry 806 and the FEM circuitry 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC 8 12 may be additionally or alternatively coupled with, and perform similar power management operations for, other components such as, but not limited to, application circuitry 802, RF circuitry 806, or FEM circuitry 808.

In some embodiments, the PMC 812 may control, or otherwise be part of, various power saving mechanisms of the device 800. For example, if the device 800 is in an RRC Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used execute Layer 3, Layer 2, or Layer 1 functionality, while processors of the application circuitry 804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
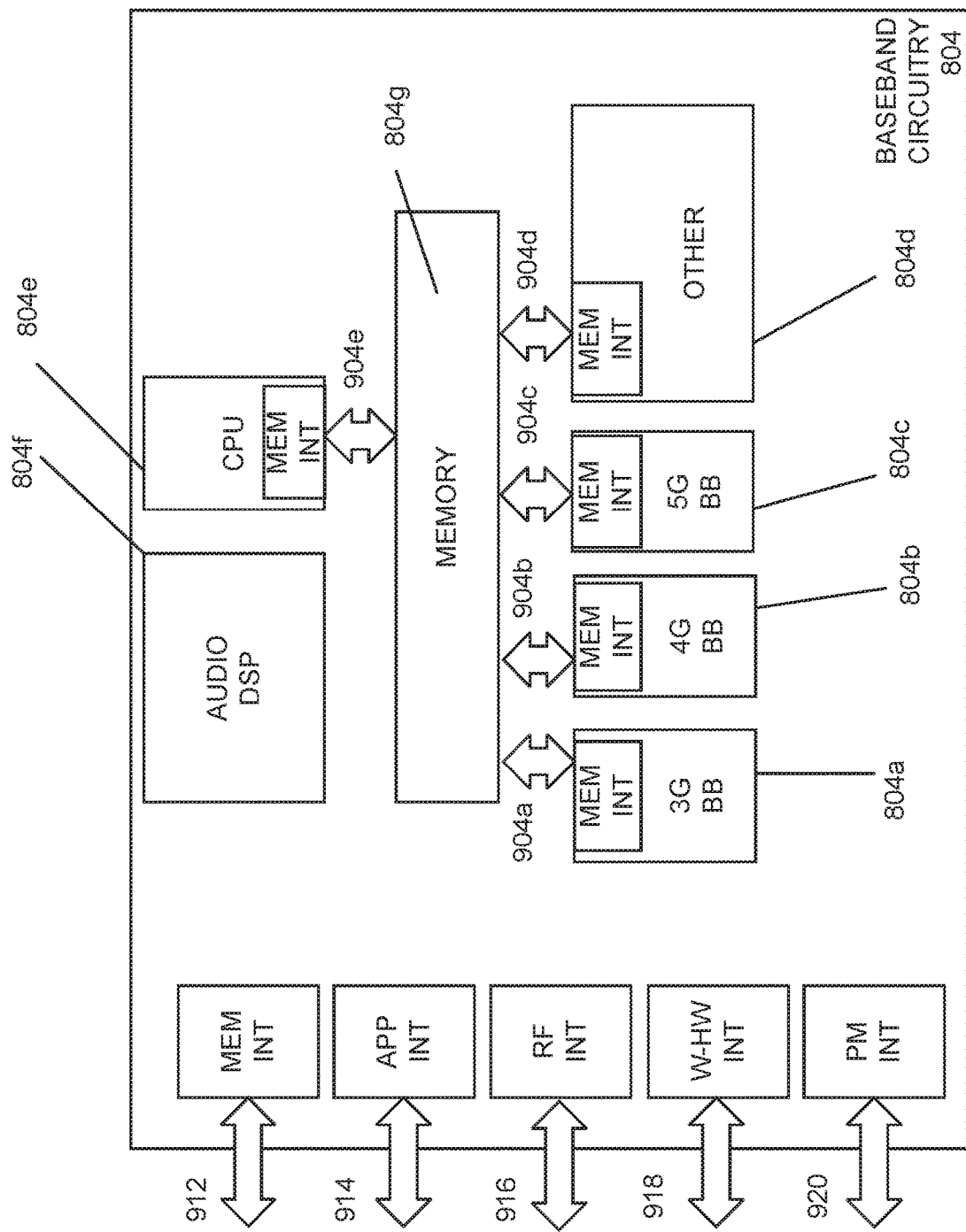
FIG. 9 illustrates interfaces of baseband circuitry in accordance with an example.

FIG. 9 illustrates example interfaces of baseband circuitry in accordance with some embodiments. As discussed above, the baseband circuitry 804 of FIG. 8 may comprise processors 804*a*-804*e* and a memory 804*g* utilized by said processors. Each of the processors 804*a*-804*e* may include a memory interface, 904*a*-904*e*, respectively, to send/receive data to/from the memory 804*g*.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812.

Figure 10:
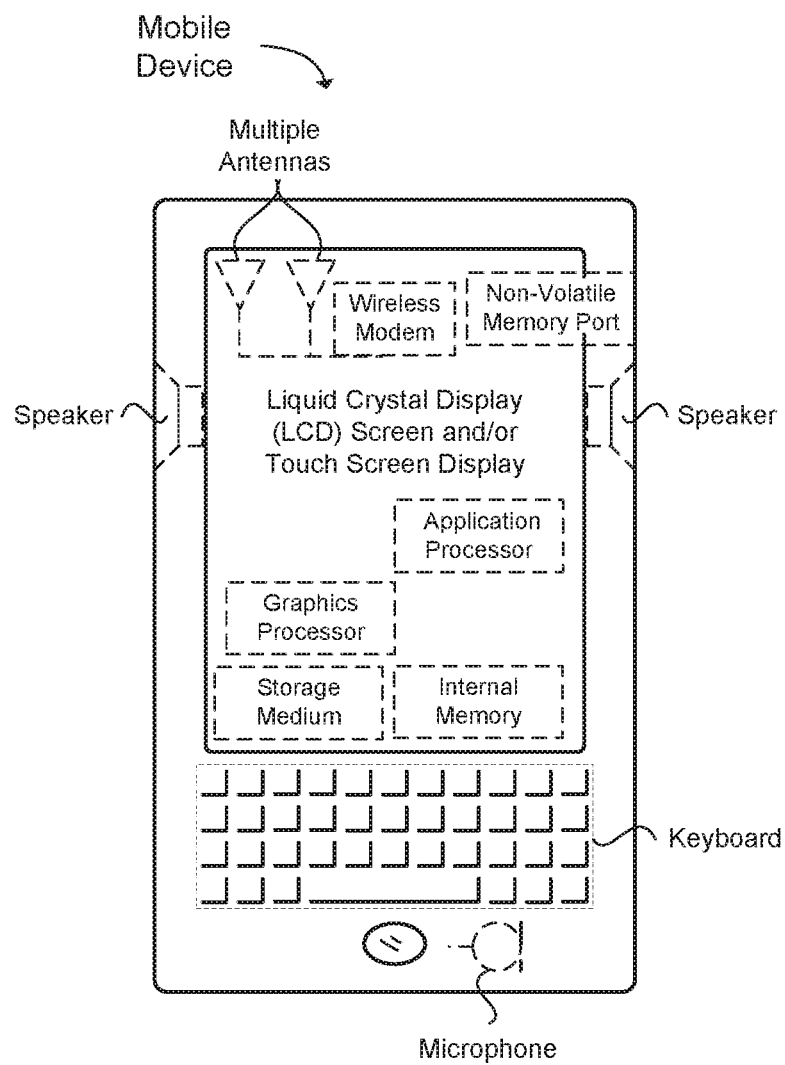
FIG. 10 illustrates a diagram of a wireless device (e.g., UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 10 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of an eNodeB operable to perform downlink (DL) transmissions using a Long Term Evolution (LTE) control region of a subframe for enhanced machine type communication (eMTC), the apparatus comprising: one or more processors configured to: encode, at the eNodeB, a system information block type 1 bandwidth reduced (SIB1-BR) for transmission to a bandwidth reduced low complexity or coverage enhancement (BL/CE) user equipment (UE), wherein the SIB1-BR includes an indication that the LTE control region in the subframe includes information for at least one of a machine type communication (MTC) physical downlink control channel (MPDCCH) transmission or a physical downlink shared channel (PDSCH) transmission; and encode, at the eNodeB, at least one of the MPDCCH transmission or the PDSCH transmission for delivery in a downlink over the LTE control region in the subframe to the BL/CE UE; and a memory interface configured to retrieve from a memory the indication to be included in the SIB1-BR.

Example 2 includes the apparatus of Example 1, further comprising a transceiver configured to: transmit the SIB1-BR including the indication to the BL/CE UE.

Example 3 includes the apparatus of any of Examples 1 to 2, wherein: the MPDCCH transmission includes a unicast MPDCCH transmission or a common MPDCCH transmission; and the PDSCH transmission includes a unicast PDSCH transmission or a common PDSCH transmission.

Example 4 includes the apparatus of any of Examples 1 to 3, wherein a first N symbols of the LTE control region in the subframe are used to carry a demodulation reference signal (DMRS) or a cell-specific reference signal (CRS), when the MPDCCH transmission or the PDSCH transmission is a unicast transmission and use of the LTE control region for at least one of the MPDCCH transmission or the PDSCH transmission is enabled, wherein a frequency domain mapping of the DMRS/CRS in the LTE control region of the subframe matches a frequency domain mapping of a DMRS/CRS in a last 14-N symbols of the subframe, wherein N is a positive integer and denotes a number of symbols in the LTE control region.

Example 5 includes the apparatus of any of Examples 1 to 4, wherein any consecutive N symbols from a last 14-N symbols of the subframe are copied to the LTE control region in the subframe, when the MPDCCH transmission or the PDSCH transmission is a common transmission and use of the LTE control region for at least one of the MPDCCH transmission or the PDSCH transmission is enabled.

Example 6 includes the apparatus of any of Examples 1 to 5, wherein the any consecutive N symbols include a first N symbols or a last N symbols from the last 14-N symbols of the subframe, wherein N is a positive integer and denotes a number of symbols in the LTE control region.

Example 7 includes the apparatus of any of Examples 1 to 6, wherein the one or more processors are further configured to decode a capability message received from the BL/CE UE, wherein the capability message indicates that the BL/CE UE is capable of receiving at least one of the MPDCCH transmission or the PDSCH transmission over the LTE control region in the subframe.

Example 8 includes the apparatus of any of Examples 1 to 7, wherein a starting symbol of at least one of the MPDCCH transmission or the PDSCH transmission in the subframe is symbol #0 in the subframe.

Example 9 includes an apparatus of a bandwidth reduced low complexity or coverage enhancement (BL/CE) user equipment (UE) operable to decode downlink (DL) transmissions received from an eNodeB over a Long Term Evolution (LTE) control region of a subframe, the apparatus comprising: one or more processors configured to: decode, at the BL/CE UE, a system information block type 1 bandwidth reduced (SIB1-BR) received from the eNodeB, wherein the SIB1-BR includes an indication that the LTE control region in the subframe includes information for at least one of a machine type communication (MTC) physical downlink control channel (MPDCCH) transmission or a physical downlink shared channel (PDSCH) transmission; and decode, at the BL/CE UE, at least one of the MPDCCH transmission or the PDSCH transmission received from the eNodeB in a downlink over the LTE control region in the subframe; and a memory interface configured to send to a memory the indication in the SIB1-BR.

Example 10 includes the apparatus of Example 9, wherein: the MPDCCH transmission includes a unicast MPDCCH transmission or a common MPDCCH transmission; and the PDSCH transmission includes a unicast PDSCH transmission or a common PDSCH transmission.

Example 11 includes the apparatus of any of Examples 9 to 10, wherein a first N symbols of the LTE control region in the subframe are used to carry a demodulation reference signal (DMRS) or a cell-specific reference signal (CRS), when the MPDCCH transmission or the PDSCH transmission is a unicast transmission and use of the LTE control region for at least one of the MPDCCH transmission or the PDSCH transmission is enabled, wherein a frequency domain mapping of the DMRS/CRS in the LTE control region of the subframe matches a frequency domain mapping of a DMRS/CRS in a last 14-N symbols of the subframe, wherein N is a positive integer and denotes a number of symbols in the LTE control region.

Example 12 includes the apparatus of any of Examples 9 to 11, wherein N symbols from a last 14-N symbols of the subframe are copied to the LTE control region in the subframe, when the MPDCCH transmission or the PDSCH transmission is a common transmission and use of the LTE control region for at least one of the MPDCCH transmission or the PDSCH transmission is enabled.

Example 13 includes the apparatus of any of Examples 9 to 12, wherein the one or more processors are further configured to encode a capability message for transmission to the eNodeB, wherein the capability message indicates that the BL/CE UE is capable of receiving at least one of the MPDCCH transmission or the PDSCH transmission over the LTE control region in the subframe.

Example 14 includes the apparatus of any of Examples 9 to 13, wherein a starting symbol of at least one of the MPDCCH transmission or the PDSCH transmission in the subframe is symbol #0 in the subframe.

Example 15 includes at least one machine readable storage medium having instructions embodied thereon for performing downlink (DL) transmissions using a Long Term Evolution (LTE) control region of a subframe for enhanced machine type communication (eMTC), the instructions when executed by one or more processors at an eNodeB perform the following: encoding, at the eNodeB, a system information block type 1 bandwidth reduced (SIB1-BR) for transmission to a bandwidth reduced low complexity or coverage enhancement (BL/CE) user equipment (UE), wherein the SIB1-BR includes an indication that the LTE control region in the subframe includes information for at least one of a machine type communication (MTC) physical downlink control channel (MPDCCH) transmission or a physical downlink shared channel (PDSCH) transmission; and encoding, at the eNodeB, at least one of the MPDCCH transmission or the PDSCH transmission for delivery in a downlink over the LTE control region in the subframe to the BL/CE UE.

Example 16 includes the at least one machine readable storage medium of Example 15, wherein: the MPDCCH transmission includes a unicast MPDCCH transmission or a common MPDCCH transmission; and the PDSCH transmission includes a unicast PDSCH transmission or a common PDSCH transmission.

Example 17 includes the at least one machine readable storage medium of any of Examples 15 to 16, wherein a first N symbols of the LTE control region in the subframe are used to carry a demodulation reference signal (DMRS) or a cell-specific reference signal (CRS), when the MPDCCH transmission or the PDSCH transmission is a unicast transmission and use of the LTE control region for at least one of the MPDCCH transmission or the PDSCH transmission is enabled, wherein a frequency domain mapping of the DMRS/CRS in the LTE control region of the subframe matches a frequency domain mapping of a DMRS/CRS in a last 14-N symbols of the subframe, wherein N is a positive integer and denotes a number of symbols in the LTE control region.

Example 18 includes the at least one machine readable storage medium of any of Examples 15 to 17, wherein N symbols from a last 14-N symbols of the subframe are copied to the LTE control region in the subframe, when the MPDCCH transmission or the PDSCH transmission is a common transmission and use of the LTE control region for at least one of the MPDCCH transmission or the PDSCH transmission is enabled, wherein the N symbols include a first N symbols or a last N symbols from the last 14-N symbols of the subframe, wherein N is a positive integer and denotes a number of symbols in the LTE control region.

Example 19 includes the at least one machine readable storage medium of any of Examples 15 to 18, further comprising instructions when executed perform the following: decoding a capability message received from the BL/CE UE, wherein the capability message indicates that the BL/CE UE is capable of receiving at least one of the MPDCCH transmission or the PDSCH transmission over the LTE control region in the subframe.

Example 20 includes the at least one machine readable storage medium of any of Examples 15 to 19, wherein a starting symbol of at least one of the MPDCCH transmission or the PDSCH transmission in the subframe is symbol #0 in the subframe.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus of a base station operable to perform downlink (DL) transmissions using a Long Term Evolution (LTE) control region of a subframe for enhanced machine type communication (eMTC), the apparatus comprising:
   one or more processors configured to:
   encode, at the base station, a system information block type 1 bandwidth reduced (SIB1-BR) for transmission to a bandwidth reduced low complexity or coverage enhancement (BL/CE) user equipment (UE), wherein the SIB1-BR includes an indication that the LTE control region in the subframe includes information for at least one of a machine type communication (MTC) physical downlink control channel (MPDCCH) transmission or a physical downlink shared channel (PDSCH) transmission, and wherein any consecutive N symbols from a last 14-N symbols of the subframe are copied to the LTE control region in the subframe, when the MPDCCH transmission or the PDSCH transmission is a common transmission and use of the LTE control region for at least one of the MPDCCH transmission or the PDSCH transmission is enabled; and
   encode, at the base station, at least one of the MPDCCH transmission or the PDSCH transmission for delivery in a downlink over the LTE control region in the subframe to the BL/CE UE; and
   a memory interface configured to retrieve from a memory the indication to be included in the SIB1-BR.

2. The apparatus of claim 1, further comprising a transceiver configured to: transmit the SIB1-BR including the indication to the BL/CE UE.

3. The apparatus of claim 1, wherein:
   the MPDCCH transmission includes a unicast MPDCCH transmission or a common MPDCCH transmission; and
   the PDSCH transmission includes a unicast PDSCH transmission or a common PDSCH transmission.

4. The apparatus of claim 1, wherein a first N symbols of the LTE control region in the subframe are used to carry a demodulation reference signal (DMRS) or a cell-specific reference signal (CRS), when the MPDCCH transmission or the PDSCH transmission is a unicast transmission and use of the LTE control region for at least one of the MPDCCH transmission or the PDSCH transmission is enabled, wherein a frequency domain mapping of the DMRS or the CRS in the LTE control region of the subframe matches a frequency domain mapping of the DMRS or the CRS in a last 14-N symbols of the subframe, wherein N is a positive integer and denotes a number of symbols in the LTE control region.

5. The apparatus of claim 1, wherein the any consecutive N symbols include a first N symbols or a last N symbols from the last 14-N symbols of the subframe, wherein N is a positive integer and denotes a number of symbols in the LTE control region.

6. The apparatus of claim 1, wherein the one or more processors are further configured to decode a capability message received from the BL/CE UE, wherein the capability message indicates that the BL/CE UE is capable of receiving at least one of the MPDCCH transmission or the PDSCH transmission over the LTE control region in the subframe.

7. The apparatus of claim 1, wherein a starting symbol of at least one of the MPDCCH transmission or the PDSCH transmission in the subframe is symbol #0 in the subframe.

8. An apparatus of a bandwidth reduced low complexity or coverage enhancement (BL/CE) user equipment (UE) operable to decode downlink (DL) transmissions received from a base station over a Long Term Evolution (LTE) control region of a subframe, the apparatus comprising:
one or more processors configured to:
decode, at the BL/CE UE, a system information block type 1 bandwidth reduced (SIB1-BR) received from the base station, wherein the SIB1-BR includes an indication that the LTE control region in the subframe includes information for at least one of a machine type communication (MTC) physical downlink control channel (MPDCCH) transmission or a physical downlink shared channel (PDSCH) transmission, and wherein N symbols from a last 14-N symbols of the subframe are copied to the LTE control region in the subframe, when the MPDCCH transmission or the PDSCH transmission is a common transmission and use of the LTE control region for at least one of the MPDCCH transmission or the PDSCH transmission is enabled; and
decode, at the BL/CE UE, at least one of the MPDCCH transmission or the PDSCH transmission received from the base station in a downlink over the LTE control region in the subframe; and
a memory interface configured to send to a memory the indication in the SIB1-BR.

9. The apparatus of claim 8, wherein:
the MPDCCH transmission includes a unicast MPDCCH transmission or a common MPDCCH transmission; and
the PDSCH transmission includes a unicast PDSCH transmission or a common PDSCH transmission.

10. The apparatus of claim 8, wherein a first N symbols of the LTE control region in the subframe are used to carry a demodulation reference signal (DMRS) or a cell-specific reference signal (CRS), when the MPDCCH transmission or the PDSCH transmission is a unicast transmission and use of the LTE control region for at least one of the MPDCCH transmission or the PDSCH transmission is enabled, wherein a frequency domain mapping of the DMRS or the CRS in the LTE control region of the subframe matches a frequency domain mapping of the DMRS or the CRS in a last 14-N symbols of the subframe, wherein N is a positive integer and denotes a number of symbols in the LTE control region.

11. The apparatus of claim 8, wherein the one or more processors are further configured to encode a capability message for transmission to the base station, wherein the capability message indicates that the BL/CE UE is capable of receiving at least one of the MPDCCH transmission or the PDSCH transmission over the LTE control region in the subframe.

12. The apparatus of claim 8, wherein a starting symbol of at least one of the MPDCCH transmission or the PDSCH transmission in the subframe is symbol #0 in the subframe.

13. At least one non-transitory machine readable storage medium having instructions embodied thereon for performing downlink (DL) transmissions using a Long Term Evolution (LTE) control region of a subframe for enhanced machine type communication (eMTC), the instructions when executed by one or more processors at a base station perform the following:
encoding, at the base station, a system information block type 1 bandwidth reduced (SIB1-BR) for transmission to a bandwidth reduced low complexity or coverage enhancement (BL/CE) user equipment (UE), wherein the SIB1-BR includes an indication that the LTE control region in the subframe includes information for at least one of a machine type communication (MTC) physical downlink control channel (MPDCCH) transmission or a physical downlink shared channel (PDSCH) transmission, and wherein N symbols from a last 14-N symbols of the subframe are copied to the LTE control region in the subframe, when the MPDCCH transmission or the PDSCH transmission is a common transmission and use of the LTE control region for at least one of the MPDCCH transmission or the PDSCH transmission is enabled; and
encoding, at the base station, at least one of the MPDCCH transmission or the PDSCH transmission for delivery in a downlink over the LTE control region in the subframe to the BL/CE UE.

14. The at least one non-transitory machine readable storage medium of claim 13, wherein:
the MPDCCH transmission includes a unicast MPDCCH transmission or a common MPDCCH transmission; and
the PDSCH transmission includes a unicast PDSCH transmission or a common PDSCH transmission.

15. The at least one non-transitory machine readable storage medium of claim 13, wherein a first N symbols of the LTE control region in the subframe are used to carry a demodulation reference signal (DMRS) or a cell-specific reference signal (CRS), when the MPDCCH transmission or the PDSCH transmission is a unicast transmission and use of the LTE control region for at least one of the MPDCCH transmission or the PDSCH transmission is enabled, wherein a frequency domain mapping of the DMRS or the CRS in the LTE control region of the subframe matches a frequency domain mapping of the DMRS or the CRS in a last 14-N symbols of the subframe, wherein N is a positive integer and denotes a number of symbols in the LTE control region.

16. The at least one non-transitory machine readable storage medium of claim 13, wherein the N symbols include a first N symbols or a last N symbols from the last 14-N symbols of the subframe, wherein N is a positive integer and denotes a number of symbols in the LTE control region.

17. The at least one non-transitory machine readable storage medium of claim 13, further comprising instructions when executed perform the following: decoding a capability message received from the BL/CE UE, wherein the capability message indicates that the BL/CE UE is capable of receiving at least one of the MPDCCH transmission or the PDSCH transmission over the LTE control region in the subframe.

18. The at least one non-transitory machine readable storage medium of claim 13, wherein a starting symbol of at least one of the MPDCCH transmission or the PDSCH transmission in the subframe is symbol #0 in the subframe.

* * * * *